United States Patent
Umeyama et al.

(10) Patent No.: US 9,960,411 B2
(45) Date of Patent: May 1, 2018

(54) METHOD OF MANUFACTURING NEGATIVE ELECTRODE FOR NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Naoto Onodera, Hirakata (JP); Naoyuki Wada, Hirakata (JP); Yusuke Fukumoto, Toyonaka (JP); Tatsuya Hashimoto, Osaka (JP); Yuji Yokoyama, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 283 days.

(21) Appl. No.: 14/943,306

(22) Filed: Nov. 17, 2015

(65) Prior Publication Data
US 2016/0141597 A1    May 19, 2016

(30) Foreign Application Priority Data
Nov. 19, 2014    (JP) ................................. 2014-234709

(51) Int. Cl.
*B29C 43/24*    (2006.01)
*B32B 37/06*    (2006.01)
(Continued)

(52) U.S. Cl.
CPC ........... *H01M 4/0435* (2013.01); *B29C 43/24* (2013.01); *B32B 37/06* (2013.01); *H01M 4/0404* (2013.01);
(Continued)

(58) Field of Classification Search
CPC ....... B29C 43/24; B29C 43/265; B29C 43/28; B29C 43/305; B32B 15/20; B32B 37/06;
(Continued)

(56) References Cited

U.S. PATENT DOCUMENTS

| 2011/0135982 A1* | 6/2011 | Muraoka | ............... H01M 4/139 |
| | | | 429/94 |
| 2011/0143199 A1 | 6/2011 | Muraoka et al. | |
| 2011/0287322 A1* | 11/2011 | Moon | ................... H01M 4/661 |
| | | | 429/245 |
| 2012/0225199 A1* | 9/2012 | Muthu | .................. H01M 4/131 |
| | | | 427/126.4 |

(Continued)

FOREIGN PATENT DOCUMENTS

| CN | 103682248 A | 3/2014 |
| CN | 103825050 A | 5/2014 |

(Continued)

*Primary Examiner* — Michael A Tolin
(74) *Attorney, Agent, or Firm* — Sughrue Mion, PLLC

(57) ABSTRACT

A method of manufacturing a negative electrode for a nonaqueous electrolyte secondary battery includes: preparing a copper foil having a first main surface and a second main surface that are opposite sides of the copper foil; obtaining a granulated body by mixing a negative electrode active material, a thickener, a binder, and a solvent with each other to obtain a mixture and by granulating the mixture; obtaining a first negative electrode mixture layer by pressing the granulated body; arranging the first negative electrode mixture layer on the first main surface; and softening the copper foil by bringing the second main surface into contact with a heated roller in a state where the first negative electrode mixture layer is arranged on the first main surface. A temperature of the heated roller is a recrystallization temperature of the copper foil or higher.

10 Claims, 10 Drawing Sheets

(51) Int. Cl.
  *H01M 4/139* (2010.01)
  *H01M 4/04* (2006.01)
  *H01M 4/66* (2006.01)
  *B32B 37/24* (2006.01)
  *H01M 4/02* (2006.01)

(52) U.S. Cl.
  CPC ......... *H01M 4/0471* (2013.01); *H01M 4/139* (2013.01); *H01M 4/661* (2013.01); *B32B 2037/243* (2013.01); *B32B 2457/10* (2013.01); *H01M 2004/027* (2013.01)

(58) Field of Classification Search
  CPC .............. B32B 37/24; B32B 2037/243; B32B 2457/10; H01M 4/0404; H01M 4/0435; H01M 4/0471; H01M 4/139; H01M 4/661; H01M 2004/027
  See application file for complete search history.

(56) References Cited

U.S. PATENT DOCUMENTS

| | | |
|---|---|---|
| 2014/0065450 A1 | 3/2014 | Senoue et al. |
| 2014/0079872 A1 | 3/2014 | Uchida et al. |
| 2015/0280208 A1* | 10/2015 | Kimura ............... H01M 4/0435 429/217 |

FOREIGN PATENT DOCUMENTS

| | | | | |
|---|---|---|---|---|
| JP | 2001216957 A | | 8/2001 | |
| JP | 2005-135856 A | | 5/2005 | |
| JP | 2005135856 A | * | 5/2005 | |
| JP | 2013077560 A | | 4/2013 | |
| JP | 2015185509 A | * | 10/2015 | .......... H01M 4/0435 |
| JP | 2016103338 A | | 6/2016 | |
| KR | 1020110049847 A | | 5/2011 | |

* cited by examiner

METHOD OF MANUFACTURING NEGATIVE ELECTRODE FOR NONAQUEOUS ELECTROLYTE SECONDARY BATTERY

INCORPORATION BY REFERENCE

The disclosure of Japanese Patent Application No. 2014-234709 filed on Nov. 19, 2014 including the specification, drawings and abstract is incorporated herein by reference in its entirety.

BACKGROUND OF THE INVENTION

1. Field of the Invention

The present invention relates to a method of manufacturing a negative electrode for a nonaqueous electrolyte secondary battery.

2. Description of Related Art

Japanese Patent Application Publication No. 2005-135856 (JP 2005-135856 A) discloses a copper (Cu) foil having a percentage elongation of 13% or higher as a negative electrode current collector for a nonaqueous electrolyte secondary battery.

In general, a negative electrode for a nonaqueous electrolyte secondary battery is manufactured by preparing a negative electrode coating material (also referred to as "slurry" or "paste"), which contains a negative electrode active material, a thickener, a binder, and a solvent, and applying the negative electrode coating material to a copper foil to form a negative electrode mixture layer. In the related art, in the negative electrode mixture layer formed using this method, a phenomenon called binder migration is observed, and this phenomenon may affect cycle durability.

Hereinafter, a potential effect of binder migration on cycle durability will be described. In a drying step, when the solvent contained in the negative electrode coating material is volatilized, the binder contained in the negative electrode coating material migrates to the surface of the coating film together with the solvent, and then segregates on the surface. As a result, on the surface side (upper layer) of the negative electrode mixture layer, the binder (typically, synthetic rubber), which is a resistance component, is abundantly present, and thus the movement of lithium ions ($Li^+$) is inhibited, which causes an increase in resistance. On the other hand, on the copper foil side (lower layer) of the negative electrode mixture layer, the binder is insufficient, and thus a defect such as the peeling of a part of the negative electrode mixture layer from the copper foil is likely to occur. Further, on the lower layer, since the amount of the binder which is a resistance component is small, the reactivity of the negative electrode active material increases, and the expansion and shrinkage of the negative electrode active material caused by charging and discharging becomes more severe than on the upper layer. Therefore, the copper foil cannot withstand the expansion and shrinkage of the negative electrode active material, and the peeling between the negative electrode mixture layer and the copper foil is promoted. Further, a difference in expansion or shrinkage amount between the upper layer and the lower layer causes an electrolytic solution to be non-uniformly distributed in the negative electrode mixture layer. As a result, in an in-plane direction or thickness direction of the negative electrode mixture layer, there is a variation in the reactivity of the negative electrode active material, local deterioration is promoted, and cycle durability decreases. This tendency is particularly significant when high-rate (high-current) charging and discharging is repeated.

Binder migration can be improved to some extent, for example, by decreasing the drying rate of the coating film. However, productivity decreases due to a decrease in the drying rate. Further, due to a long period of heat treatment, the thickener contained in the negative electrode mixture layer is carbonized, and thus resistance may increase.

According to JP 2005-135856 A, when the copper foil having a high percentage elongation is used, the copper foil can withstand the expansion and shrinkage of the negative electrode active material caused by charging and discharging, a defect such as the peeling of the negative electrode active material from the copper foil can be suppressed. However, the copper foil having a high percentage elongation (that is, easy to modify) is difficult to handle in an application step and causes, for example, a decrease in the dimension accuracy of the negative electrode mixture layer or a decrease in yield. The use of the copper foil itself does not suppress binder migration.

SUMMARY OF THE INVENTION

The present invention provides a method of manufacturing a negative electrode for a nonaqueous electrolyte secondary battery having superior cycle durability.

An aspect of the present invention is a method of manufacturing a negative electrode for a nonaqueous electrolyte secondary battery. The method includes: preparing a copper foil having a first main surface and a second main surface that are opposite sides of the copper foil; obtaining a granulated body by mixing a negative electrode active material, a thickener, a binder, and a solvent with each other to obtain a mixture and by granulating the mixture; obtaining a first negative electrode mixture layer by pressing the granulated body; arranging the first negative electrode mixture layer on the first main surface; and softening the copper foil by bringing the second main surface into contact with a heated roller in a state where the first negative electrode mixture layer is arranged on the first main surface. A temperature of the heated roller is a recrystallization temperature of the copper foil or higher.

In the above-described manufacturing method, the negative electrode mixture layer is formed by using the granulated body instead of a coating material. "Granulated body" described herein refers to an aggregate of granulated particles which are obtained by mixing a negative electrode active material, a thickener, and a binder with a small amount of solvent to obtain a mixture and granulating the mixture. This granulated body has higher solid content proportion (mass proportion of components of the mixture excluding liquid) than a coating material. The granulated body can be processed into an independent negative electrode mixture layer (sheet) by being pressed between rollers. In the negative electrode mixture layer formed of the granulated body, the solid content proportion is high (that is, the proportion of a solvent is low), and the migration range of the binder is limited to the inside of each granulated particle. Therefore, binder migration during drying is improved.

In the above-described manufacturing method, the recrystallization of copper is promoted and the copper foil is softened by bringing the heated roller (heat roller) and the copper foil into contact with each other. As a result, the copper foil can withstand the expansion and shrinkage of the negative electrode active material, and thus cycle durability is improved. Here, the contact between the heat roller and the copper foil (second main surface) is performed in a state where the first negative electrode mixture layer is arranged on the first main surface. That is, the copper foil is softened in a state where the copper foil is supported by the first negative electrode mixture layer. Therefore, deterioration in handleability caused by the softening of the copper foil is suppressed.

By adopting the heat roller, the copper foil can be softened through a short period of heat treatment. Accordingly, thermal damage on the respective components contained in the first negative electrode mixture layer is reduced. As a result, the carbonization of the thickener is suppressed.

Due to a combination of the above-described effects, a negative electrode which is manufactured using the above-described manufacturing method can exhibit superior cycle durability.

In the aspect of the present invention, the temperature of the heated roller may be from 200° C. to 400° C. during the softening of the copper foil.

By setting the temperature of the roller to be within the above-described range, cycle durability is improved.

In the aspect of the present invention, a contact time between the heated roller and the second main surface may be from 1 second to 10 seconds during the softening of the copper foil.

By setting the contact time to be within the above-described range, cycle durability is improved.

In the aspect of the present invention, the prepared copper foil may have a percentage elongation after fracture of 3% or lower before the softening. Furthermore, the softened copper foil may have a percentage elongation after fracture of from 10% to 15%.

According to the above aspect of the present invention, the handleability of the copper foil before softening is high, and the allowable elongation of the copper after softening is secured. As a result, cycle durability can be improved.

In the aspect of the present invention, the prepared copper foil may have a percentage elongation after fracture of 3% or lower before the softening. Furthermore, at least one of the temperature of the heated roller and a contact time between the heated roller and the second main surface may be adjusted such that the softened copper foil has a percentage elongation after fracture of from 10% to 15%.

According to the above aspect of the present invention, the handleability of the copper foil before softening is high, and the allowable elongation of the copper after softening is secured. As a result, cycle durability can be improved.

In the aspect of the present invention, the arranging of the first negative electrode mixture layer on the first main surface and the softening of the copper foil may be simultaneously performed.

According to the above aspect of the present invention, the process of manufacturing a negative electrode for a nonaqueous electrolyte secondary battery can be simplified.

In the aspect of the present invention, when the granulated body is obtained, a solid content proportion of the granulated body may be from 65 mass % to 80 mass %.

A typical solid content proportion of a coating material is about 60 mass % or lower. According to the above aspect of the present invention, binder migration can be more reliably suppressed as compared to a case where the solid content proportion is set to be in the typical range.

The method according to the present invention may further include arranging a second negative electrode mixture layer on the second main surface after the softening of the copper foil.

In the above aspect of the present invention, a negative electrode in which the negative electrode mixture layer is formed on both the first main surface and the second main surface is manufactured. According the this aspect of the present invention, thermal damage on the second negative electrode mixture layer can be reduced.

As described above, according to the aspect of the present invention, a negative electrode for a nonaqueous electrolyte secondary battery having superior cycle durability is provided.

BRIEF DESCRIPTION OF THE DRAWINGS

Features, advantages, and technical and industrial significance of exemplary embodiments of the present invention will be described below with reference to the accompanying drawings, in which like numerals denote like elements, and wherein.

DETAILED DESCRIPTION OF EMBODIMENTS

Hereinafter, embodiments of the present invention will be described. However, the embodiments are not limited to the following description.

Figure 1:
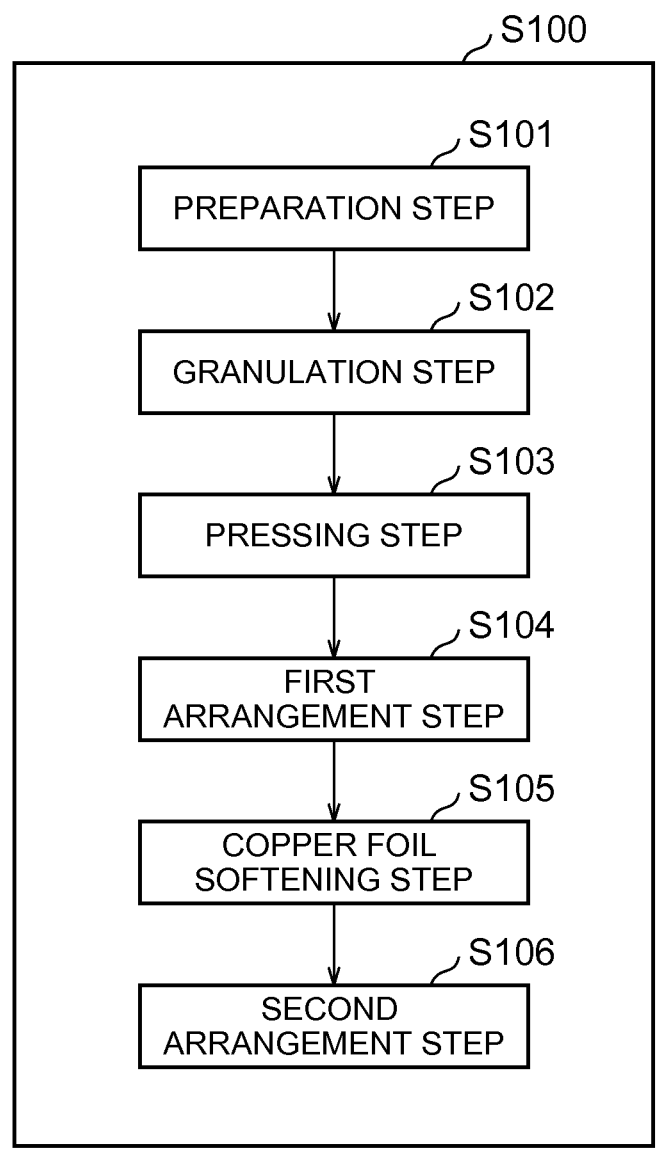
FIG. 1 is a flowchart showing the summary of a negative electrode for a nonaqueous electrolyte secondary battery according to an embodiment of the present invention.

A first embodiment relates to a method of manufacturing a negative electrode for a nonaqueous electrolyte secondary battery. FIG. 1 is a flowchart showing the summary of the manufacturing method. As shown in FIG. 1, the manufacturing method includes a preparation step S101, a granulation step S102, a pressing step S103, a first arrangement step S104, a copper foil softening step S105, and a second arrangement step S106. Hereinafter, each step will be described.

In the preparation step S101, a copper foil 21 having a first main surface 21a and a second main surface 21b is prepared, the first main surface 21a and the second main surface 21b being opposite sides of the copper foil 21. The copper foil 21 may be an electrolytic copper foil or a rolled copper foil. However, a rolled copper foil is preferable in consideration of mechanical characteristics (percentage elongation after fracture). The copper foil 21 may contain a slight amount (for example, lower than 0.5%) of an element other than copper. The element may be an impurity element which is unavoidably incorporated during the preparation of the copper foil, or may be an additive element which is intentionally introduced. The copper foil can be softened by being heated to a recrystallization temperature or higher. "Recrystallization temperature" described herein refers to a temperature at which a metal material starts to be recrystallized. The recrystallization temperature of pure copper is typically about from 150° C. to 200° C. but may deviate from this temperature range due to, for example, an effect of an impurity element, an additive element, or a manufacturing process.

The thickness of the copper foil 21 is preferably from 5 μm to 20 μm and more preferably from 5 μm to 15 μm. At this time, it is preferable that the copper foil 21 is not softened. When a softened copper foil is used from the beginning, the copper foil is easy to modify, and thus productivity decreases. The percentage elongation after fracture of the copper foil 21 is preferably 3% or lower, more preferably 2% or lower, and still more preferably 1.5% or lower.

Here, "percentage elongation after fracture" refers to a value which is measured and calculated according to "JIS Z 2241: metal material tensile testing method." In "JIS Z 2241: metal material tensile testing method", percentage elongation after fracture is defined as a ratio (by percentage) of a percentage permanent elongation after fracture to an original gauge length $L_0$. The gauge length refers to the length on which where the elongation is measured in a parallel portion of a test piece. The original gauge length $L_0$ refers to the gauge length of the test piece which has been measured at room temperature before the test, and is specified on the test piece. The percentage permanent elongation refers to the increase in the original gauge length $L_0$ after removal of predetermined stress, expressed as a percentage of the original gauge length $L_0$. The percentage permanent elongation after fracture is a value ($L_u$–$L_0$) which is obtained by subtracting the original gauge length $L_0$ from a final gauge length after fracture $L_u$. The final gauge length after fracture refers to the gauge length of the test piece which has been measured at room temperature after fracture, and is specified in the test piece. The final gauge length after fracture $L_u$ is measured after two fractured test pieces are fitted together such that their axes lie in a straight line.

In the granulation step S102, an granulated body which is an aggregate of granulated particles is prepared. The granulated body is prepared by mixing a negative electrode active material, a thickener, a binder, and a solvent with each other to obtain a mixture and granulating the mixture. For example, in a predetermined mixer, a negative electrode active material, a thickener, a binder, and water are mixed with each other to obtain a mixture. As the mixer, for example, "HIGH-SPEED MIXER" (manufactured by EARTHTECHNICA Co., Ltd.) can be used. At this time, it is preferable that a solid content proportion of the mixture is adjusted such that the mixture is clay-like. In consideration of the dispersibility of the binder, it is preferable that the solvent is dividedly added such that the solid content proportion is obtained through multiple stages.

Figure 3:
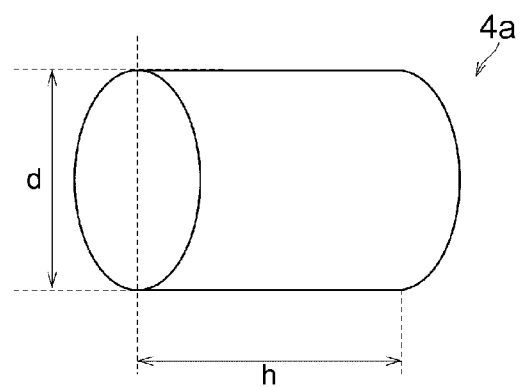
FIG. 3 is a schematic diagram showing a granulated particle according to the embodiment of the present invention.

Next, a granulated body is obtained by granulating the mixture. A granulation method is not particularly limited. For example, agitation granulation, fluidized bed granulation, extrusion granulation, compression granulation, or spray granulation can be performed. Among these, extrusion granulation is particularly preferable because it is easy to control the shape of each granulated particle into a desired shape. As an extrusion granulator, for example, "in-line cylindrical granulator" (manufactured by EARTHTECHNICA Co., Ltd.) is preferable. In the extrusion granulation, the shape and size of the granulated particles can be adjusted based on a die hole of the granulator. For example, when the die hole is circular, cylindrical granulated particles can be prepared. The cylindrical granulated particles have superior filling characteristics. FIG. 3 is a schematic diagram showing a cylindrical granulated particle. It is preferable that a granulated particle 4a has a diameter d of about from 0.5 mm to 2.0 mm, and has a height h which is about from 1.0 time to 3.0 times of the diameter d.

A final solid content proportion of the granulated body is preferably from 65 mass % to 80 mass %. When the solid content proportion is lower than 65 mass %, it may be difficult to perform roller forming. In addition, when the solid content proportion is higher than 80 mass %, it may be difficult to form the granulated body into a uniform sheet (negative electrode mixture layer). Within the above-described range, binder migration can be more reliably suppressed. The solid content proportion of the granulated body is more preferably from 67 mass % to 75 mass % and still more preferably from 68 mass % to 74 mass %.

The proportion of the negative electrode active material in the solid content of the granulated body is, for example, from 90 mass % to 99 mass %, and is preferably from 95 mass % to 99 mass % and more preferably from 97 mass % to 99 mass %. The negative electrode active material is not particularly limited, and any material which can function as a negative electrode active material of a nonaqueous electrolyte secondary battery can be used. For example, a carbon negative electrode active material such as graphite or coke, or an alloy negative electrode active material of silicon (Si), tin (Sn), or the like can be used.

The proportion of the thickener in the solid content of the granulated body is preferably from 0.5 mass % to 1.0 mass %. When the proportion of the thickener is lower than 0.5 mass %, desired shearing stress is not applied during mixing, and thus the dispersibility of the respective components may decrease. When the proportion of the thickener is higher than 1.0 mass %, resistance may increase. The proportion of the thickener is more preferably from 0.6 mass % to 0.9 mass % and still more preferably from 0.7 mass % to 0.9 mass %. The thickener is not particularly limited, and any material which can function as a thickener of a nonaqueous electrolyte secondary battery can be used. For example, carboxymethyl cellulose (CMC) or polyvinyl alcohol (PVA) can be used.

The proportion of the binder in the solid content of the granulated body is preferably from 0.5 mass % to 1.0 mass %, more preferably from 0.6 mass % to 1.0 mass %, and still more preferably from 0.7 mass % to 1.0 mass %. The binder is not particularly limited, and any material which can function as a binder of a nonaqueous electrolyte secondary battery can be used. For example, styrene-butadiene rubber (SBR), acrylic rubber (AR), urethane rubber, or polytetrafluoroethylene (PTFE) can be used.

In the pressing step S103, a first negative electrode mixture layer 22a is obtained by pressing the granulated body into a sheet shape.

Figure 2:
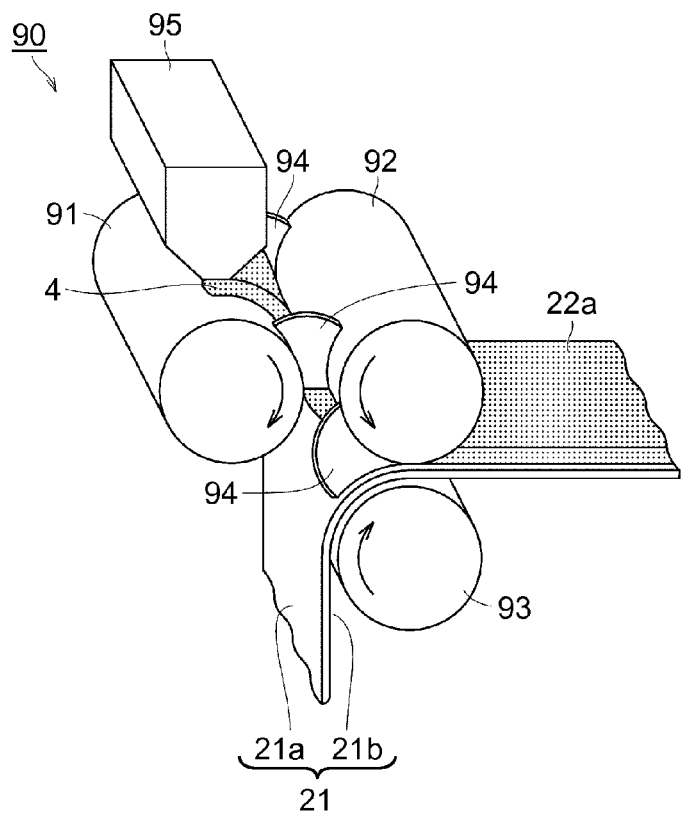
FIG. 2 is a flowchart showing a part of a method of manufacturing the negative electrode for a nonaqueous electrolyte secondary battery according to the embodiment of the present invention.

FIG. 2 is a schematic diagram showing the pressing step S103, and the first arrangement step S104 and the copper foil softening step S105 described below. The granulated body 4 is put into a feeder 95 of a transfer forming device 90 shown in FIG. 2. The granulated body 4 is supplied from the feeder 95 onto an A roller 91. In FIG. 2, arrows indicate rotating directions of the respective roller members. The granulated body 4 is transported along the A roller 91 in the arrow direction and reaches a gap between the A roller 91 and a B roller 92. In the gap, pressure is applied from the A roller 91 and the B roller 92 to the granulated body 4 such that the granulated body 4 is formed into a sheet shaped first negative electrode mixture layer 22a. The width of the first negative electrode mixture layer 22a is adjusted by partition members 94. The coating weight (mass per unit area) of the first negative electrode mixture layer 22a is adjusted by the gap between the A roller 91 and the B roller 92.

In the first arrangement step S104, the first negative electrode mixture layer 22a is arranged on the first main surface 21a of the copper foil 21. As shown in FIG. 2, the first negative electrode mixture layer 22a which has been formed into a sheet shape is transported along the B roller 92 in the arrow direction. The copper foil 21 is transported along a C roller 93 in the arrow direction. In the gap between the B roller 92 and the C roller 93, pressure is applied from the B roller 92 and the C roller 93 to the first negative electrode mixture layer 22a and the copper foil 21 such that the first negative electrode mixture layer 22a is transferred from the B roller 92 to the copper foil 21 (first main surface 21a) and is pressure-bonded to the first main surface 21a.

In the transfer forming device 90 shown in FIG. 2, the first arrangement step S104 and the copper foil softening step S105 are simultaneously performed. That is, the C roller 93 contacting the second main surface 21b of the copper foil 21 is heated to a recrystallization temperature of the copper foil or higher. As a result, the copper foil 21 is heated through the second main surface 21b such that copper is recrystallized and softened. At this time, the first negative electrode mixture layer 22a is already arranged on at least a part of the first main surface 21a, and the copper foil 21 is supported by the first negative electrode mixture layer 22a. As a result, the copper foil 21 and the first negative electrode mixture layer 22a can be stably transported on the subsequent pass line.

In the copper foil softening step S105, the temperature of the C roller 93 is preferably from 200° C. to 400° C. When the temperature of the C roller 93 is lower than 200° C., the copper foil 21 may be insufficiently softened. When the temperature of the C roller 93 is higher than 400° C., the first negative electrode mixture layer 22a may be thermally damaged. The temperature of the C roller 93 is more preferably from 250° C. to 400° C. and still more preferably from 250° C. to 350° C.

The contact time between the copper foil 21 and the C roller 93 can be adjusted based on the rotating speed, diameter, and the like of the C roller 93. At this time, in order to suppress the carbonization of the thickener, it is preferable that the contact time is adjusted such that the temperature of the first negative electrode mixture layer 22a does not exceed 300° C. The contact time is preferably from 1 second to 15 seconds, more preferably from 1 second to 10 seconds, and still more preferably from 5 seconds to 10 seconds.

It is preferable that the softening degree of the copper foil 21 is adjusted such that the percentage elongation after fracture of the copper foil 21 is 10% or higher. By adjusting the percentage elongation after fracture of the copper foil 21 to be 10% or higher, cycle durability is significantly improved. However, when a heat treatment is performed until the percentage elongation after fracture is higher than 15%, the thickener in the first negative electrode mixture layer 22a may be carbonized. Accordingly, the percentage elongation after fracture is preferably from 10% to 15%. The percentage elongation after fracture is more preferably from 10.5% to 14.2% and still more preferably from 11% to 13.8%.

The copper foil softening step S105 and the first arrangement step S104 may not be simultaneously performed. For example, the following configuration may be adopted in which, instead of using a heat roller as the C roller 93, a heat roller is separately provided on a pass line after the C roller 93 so as to bring the second main surface 21b and the heat roller into contact with each other. In order to sufficiently dry the first negative electrode mixture layer 22a, a drying furnace (not shown) may be provided on a pass line after the C roller 93.

In the second arrangement step S106, the second negative electrode mixture layer 22b is arranged on the second main surface 21b of the copper foil 21. The second negative electrode mixture layer 22b is manufactured using the same method as the first negative electrode mixture layer 22a, and is arranged on the second main surface 21b using the same method as the first arrangement step S104. During the arrangement of the second negative electrode mixture layer 22b, it is preferable that the C roller 93 shown in FIG. 2 is not heated in order to prevent the first negative electrode mixture layer 22a contacting the C roller 93 from being thermally damaged in the second arrangement step S106. In this step, similar to the first negative electrode mixture layer 22a, the second negative electrode mixture layer 22b may be dried using a drying furnace.

Next, a laminate of the first negative electrode mixture layer 22a, the second negative electrode mixture layer 22b, and the copper foil 21 is rolled into a predetermined thickness and is cut into a predetermined dimension. As a result, the negative electrode 20 shown in FIG. 4 is obtained.

Figure 4:
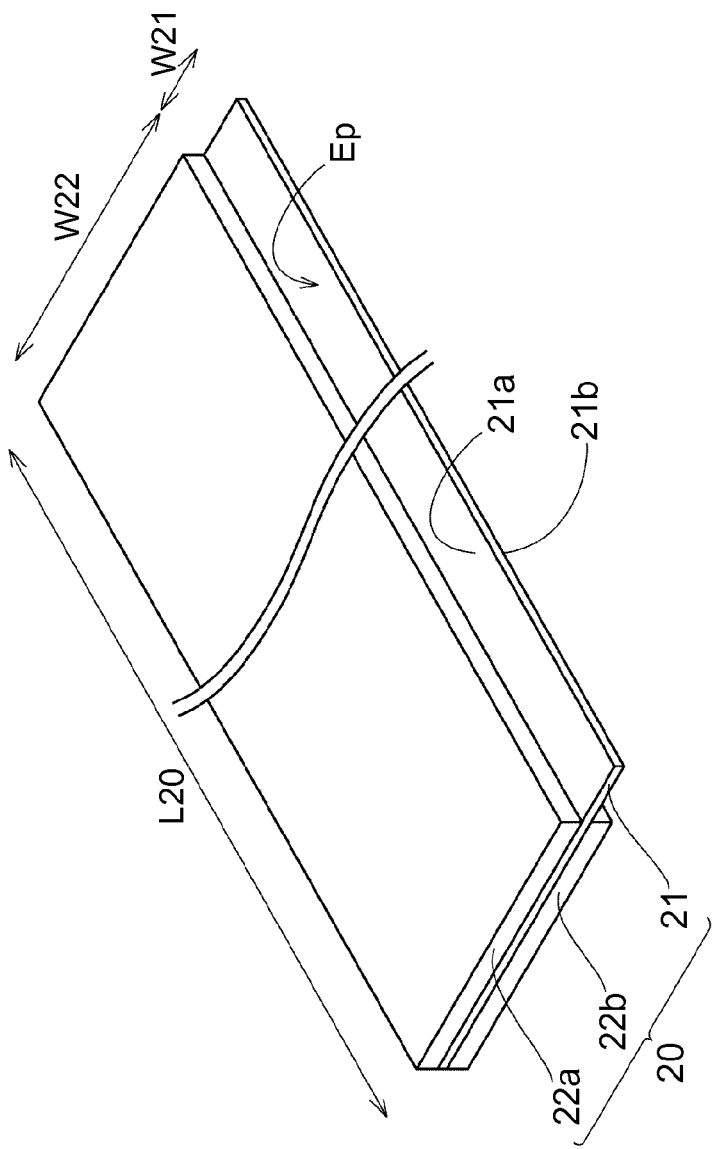
FIG. 4 is a schematic diagram showing a configuration example of a negative electrode according to the embodiment of the present invention.

As shown in FIG. 4, the negative electrode 20 is an elongated belt-shaped sheet member. The negative electrode 20 includes: the copper foil 21 having the first main surface 21a and the second main surface 21b, the first main surface 21a and the second main surface 21b being opposite sides of the copper foil; the first negative electrode mixture layer 22a that is formed on the first main surface 21a; and the second negative electrode mixture layer 22b that is formed on the second main surface 21b. The negative electrode 20 includes an exposure portion Ep where the copper foil 21 is exposed. As described below, the exposure portion Ep is provided for current collection.

Figure 5:
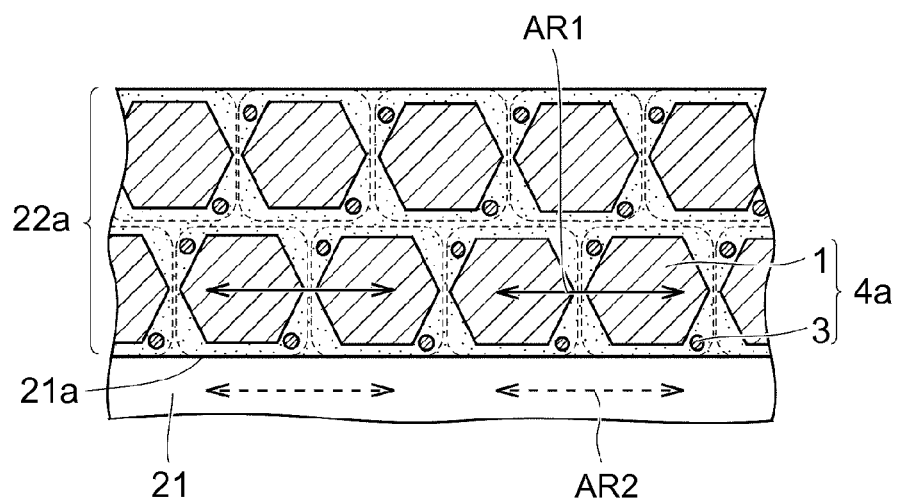
FIG. 5 is a schematic sectional view showing a configuration example of a negative electrode according to the embodiment of the present invention.

FIG. 5 is a schematic sectional view of the negative electrode 20. As shown in FIG. 5, the negative electrode 20 includes: the copper foil 21; and the first negative electrode mixture layer 22a that is formed on the first main surface 21a of the copper foil 21. The first negative electrode mixture layer 22a is formed of the granulated body and contains the plural granulated particles 4a. Each of the granulated particles 4a contains a negative electrode active material 1, a thickener (not shown), and a binder 3. Although not shown in FIG. 5, the second negative electrode mixture layer 22b having the same configuration as the first negative electrode mixture layer 22a is formed on the second main surface 21b opposite the first main surface 21a.

Arrow AR1 in FIG. 5 represents an expansion shrinkage direction of the negative electrode active material 1, and Arrow AR2 represents an expansion shrinkage direction of the copper foil 21. As described above, the copper foil 21 is softened and thus can withstand the expansion and shrinkage of the negative electrode active material 1. During high-rate charging and discharging cycles during which the expansion and shrinkage of the negative electrode active material 1 becomes severe, the peeling between the first negative electrode mixture layer 22a and the copper foil 21 is suppressed.

The first negative electrode mixture layer 22a and the second negative electrode mixture layer 22b are formed of the granulated body, and binder migration is suppressed during the formation process thereof. Therefore, in these negative electrode mixture layers, the binder 3 is uniformly distributed in the thickness direction. Accordingly, an increase in the resistance on the surface, and the peeling between the negative electrode mixture layers and the copper foil is suppressed.

Figure 6:
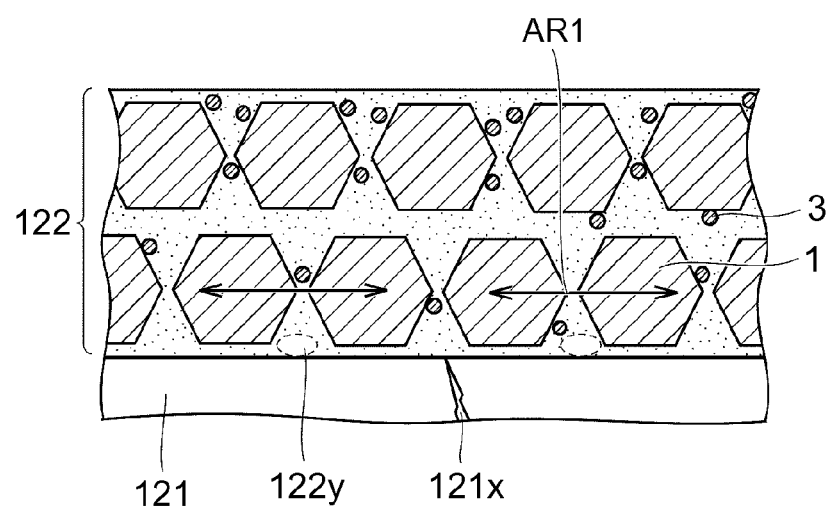
FIG. 6 is a schematic sectional view showing a configuration example of a negative electrode according to Reference Example.

FIG. 6 is a schematic sectional view showing a configuration example of a negative electrode according to Reference Example. In the negative electrode shown in FIG. 6, a copper foil 121 is not softened, and a negative electrode mixture layer 122 is formed of a coating material. In this negative electrode, the binder 3 segregates on the surface of the negative electrode mixture layer 122 due to binder migration. Therefore, the movement of $Li^+$ is inhibited, and resistance is high. The copper foil 121 is hard and cannot withstand the expansion and shrinkage of the negative electrode active material 1. Therefore, a gap 122y is formed due to partial peeling between the negative electrode mixture layer 122 and the copper foil 121. Since the copper foil 121 does not expand, for example, a small crack 121x may be formed on the copper foil 121. As a result, cycle durability decreases in the negative electrode.

The distribution of the binder in the thickness direction of the negative electrode mixture layer can be evaluated based on, for example, a migration index (MI).

MI can be calculated by analyzing a section of the negative electrode through scanning electron microscope-energy dispersive X-ray spectrometry (SEM-EDX). The measurement procedure is as follows. First, a sample for section observation is cut from the negative electrode, and a section of the sample is cleaned using, for example, a cross-section polisher (CP). Next, the binder is modified with a predetermined element or compound. For example, in a binder, such as SBR, containing a carbon-carbon double bond, the double bond can be modified with, for example, bromine (Br). After the binder is modified, the section is analyzed by SEM-EDX for mapping of Br. At this time, the section is divided into two regions in the thickness direction including: a first region that is positioned on the copper foil side; and a second region that is positioned on the surface of the negative electrode mixture layer. MI can be calculated by dividing an integrated value of detected intensity of BR in the second region by an integrated value of detected intensity of BR in the first region. When the binder is uniformly dispersed, MI is close to 1.0.

In the embodiment, since the negative electrode mixture layer is formed of the granulated body, MI falls within a range of from 0.7 to 1.2. On the other hand, in the negative electrode mixture layer formed of the coating material (paste), MI exceeds 1.5.

Figure 7:
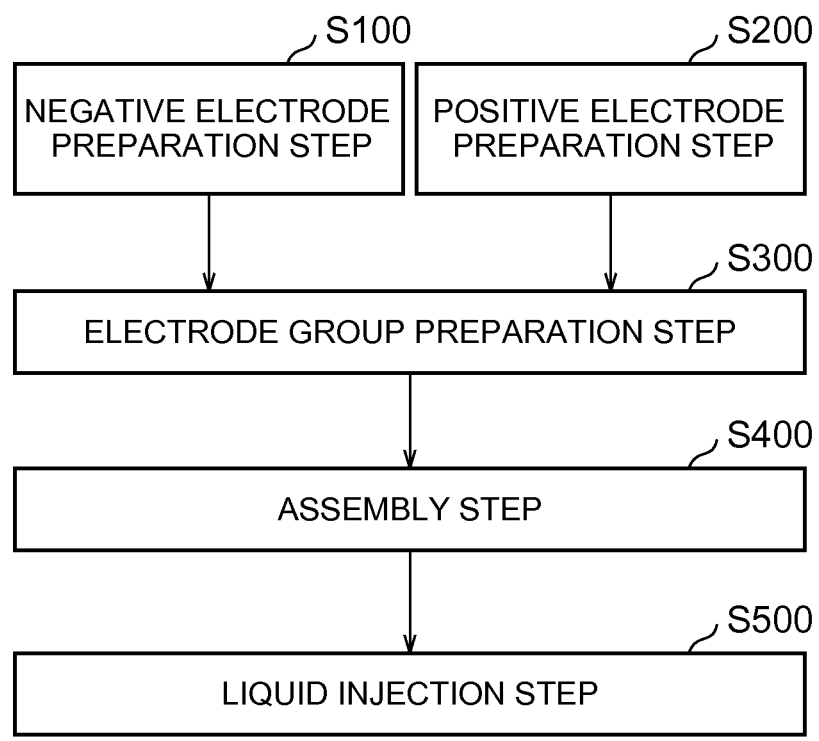
FIG. 7 is a flowchart showing the summary of a method of manufacturing a nonaqueous electrolyte secondary battery according to an embodiment of the present invention.

A second embodiment relates to a method of manufacturing a nonaqueous electrolyte secondary battery including the steps according to the first embodiment (method of manufacturing a negative electrode for a nonaqueous electrolyte secondary battery). FIG. 7 is a flowchart showing the summary of the method of manufacturing a nonaqueous electrolyte secondary battery according to the embodiment of the present invention. As shown in FIG. 7, the manufacturing method includes a negative electrode preparation step S100, a positive electrode preparation step S200, an electrode group preparation step S300, an assembly step S400, and a liquid injection step S500. Among these steps, the negative electrode preparation step S100 corresponds to the method of manufacturing a negative electrode for a nonaqueous electrolyte secondary battery described as the first embodiment. Hereinafter, the steps other than the negative electrode preparation step S100 will be described.

Figure 8:
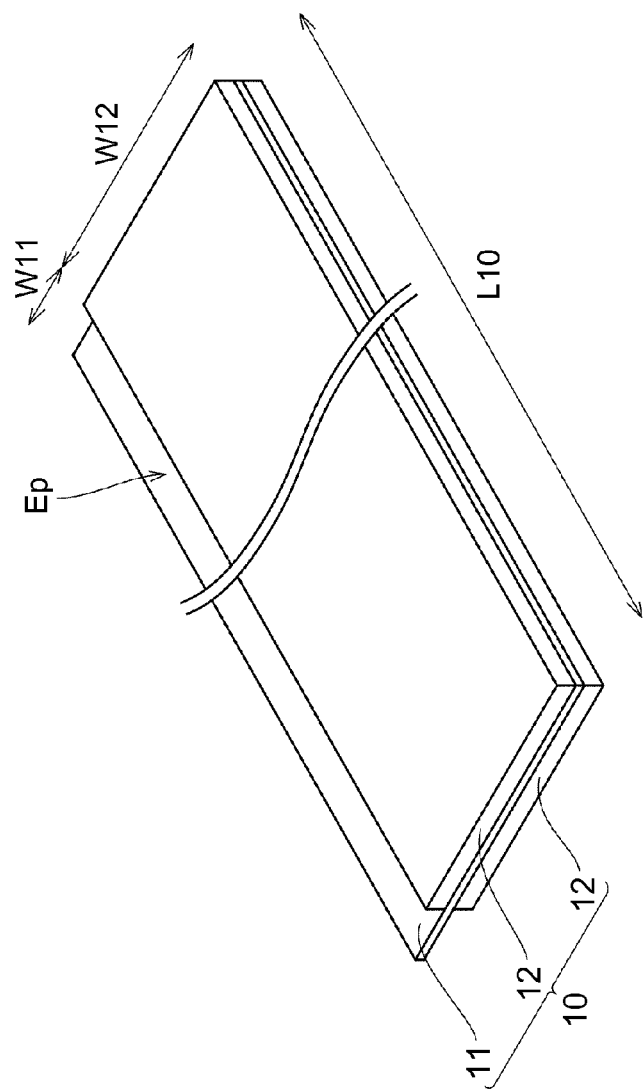
FIG. 8 is a schematic diagram showing a configuration example of a positive electrode according to the embodiment of the present invention.

In the positive electrode preparation step S200, the positive electrode 10 shown in FIG. 8 is prepared. As shown in FIG. 8, the positive electrode 10 is an elongated belt-shaped sheet member. The positive electrode 10 includes: a positive electrode current collector foil 11; and a positive electrode mixture layer 12 that is formed on both main surfaces of the positive electrode current collector foil 11. The positive electrode 10 includes an exposure portion Ep where the positive electrode current collector foil 11 is exposed. The exposure portion Ep is provided for current collection. The positive electrode current collector foil 11 is, for example, an aluminum (Al) foil.

The positive electrode 10 can be prepared, for example, as follows. That is, the positive electrode mixture layer 12 may be formed by kneading a positive electrode active material, a conductive material, and a binder with each other in N-methyl-2-pyrrolidone (NMP) to obtain a positive electrode coating material, applying the positive electrode coating material to a predetermined position on the positive electrode current collector foil 11 using a die coater or the like, and drying the positive electrode coating material. Using a rolling mill or the like, the thickness of the positive electrode mixture layer 12 may be adjusted.

The positive electrode active material is not particularly limited, and any material which can function as a positive electrode active material of a nonaqueous electrolyte secondary battery can be used. For example, $LiCoO_2$, $LiNiO_2$, $LiNi_aCo_bO_2$ (wherein, a+b=1, 0<a<1, and 0<b<1), $LiMnO_2$, $LiMn_2O_4$, $LiNi_aCo_bMn_cO_2$ (wherein, a+b+c=1, 0<a<1, 0<b<1, and 0<c<1), or $LiFePO_4$ can be used. The proportion of the positive electrode active material in the solid content of the positive electrode coating material is, for example, about 80 mass % to 98 mass %.

As the conductive material, for example, acetylene black (AB) or graphite can be used. The proportion of the conductive material in the solid content of the positive electrode coating material is, for example, about 1 mass % to 10 mass %. As the binder, for example, polyvinylidene fluoride (PVDF) or PTFE can be used. The proportion of the binder in the solid content of the positive electrode coating material is, for example, about 1 mass % to 10 mass %.

Figure 9:
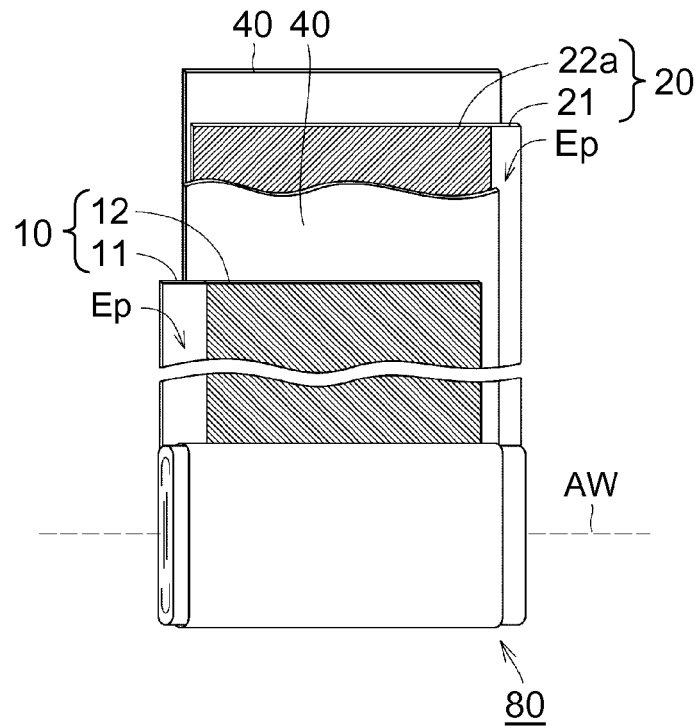
FIG. 9 is a schematic diagram showing the process of manufacturing an electrode group according to the embodiment of the present invention.

In the electrode group preparation step S300, the electrode group 80 is prepared. FIG. 9 is a schematic diagram showing the process of manufacturing the electrode group 80. As shown in FIG. 9, the electrode group 80 is prepared by arranging the positive electrode 10 and the negative electrode 20 to face each other with separators 40 interposed therebetween, and winding the components along a longitudinal direction thereof. At this time, the exposure portions of the positive electrode 10 and the negative electrode 20 are arranged in opposite end portions on the winding axis AW. The electrode group 80 may be wound into an elliptical shape and then pressed into a flat shape.

As the separator 40, a microporous membrane formed of a polyolefin material is preferable from the viewpoints of mechanical strength and chemical stability. For example, a microporous membrane formed of polyethylene (PE), polypropylene (PP), or the like is preferable. The thickness of the separator 40 is, for example, 5 μm to 40 μm. The pore size and porosity of the separator 40 may be appropriately adjusted such that the air permeability is a desired value.

In the separator 40, plural microporous membranes may be laminated, or a heat resistance layer containing an inorganic filler (for example, alumina particles) may be formed on the surface thereof. The heat resistance layer can be formed, for example, as follows.

First, an inorganic filler, a thickener, and a binder are kneaded with each other in a solvent to obtain a paste for forming the heat resistance layer. As the thickener, for example, CMC can be used. As the binder, for example, an acrylic resin can be used. For the kneading, for example, an ultrasonic disperser, for example, "CLEARMIX" (manufactured by M Technique Co., Ltd.) can be used. Next, the separator including the heat resistance layer can be prepared by applying the paste to a microporous membrane such as PE or PP and drying the paste. An application method may be a gravure coating method.

Figure 10:
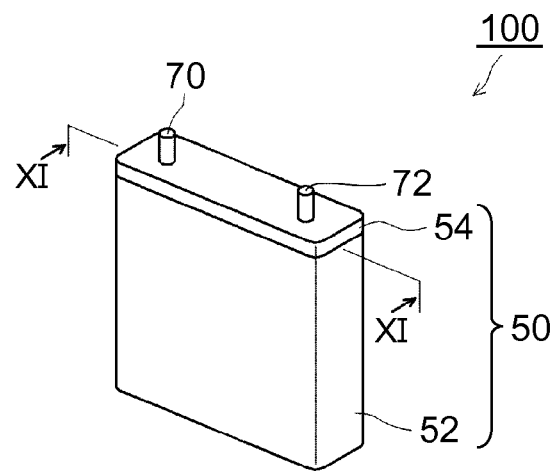
FIG. 10 is a schematic diagram showing a nonaqueous electrolyte secondary battery according to the embodiment of the present invention.
Figure 11:
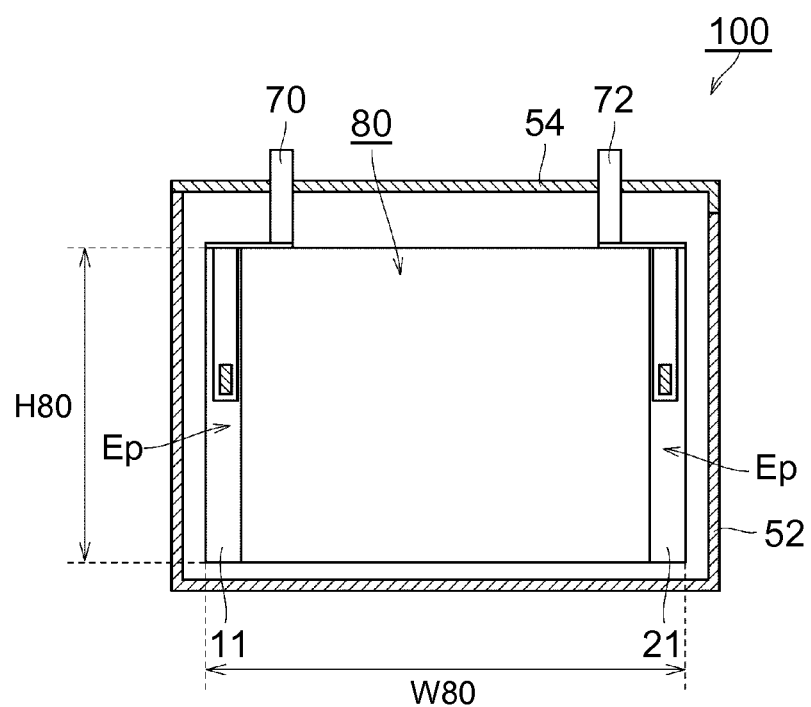
FIG. 11 is a schematic sectional view taken along line XI-XI of FIG. 10.

In the assembly step S400, first, a square housing 50 shown in FIGS. 10 and 11 is prepared. The square housing 50 includes a bottomed square case 52 and a lid 54. The square housing 50 is formed of, for example, an Al alloy. A positive electrode terminal 70 and a negative electrode terminal 72 are provided on the lid 54.

As shown in FIG. 11, the exposure portion Ep of the electrode group 80 on the positive electrode 10 side is electrically connected to the positive electrode terminal 70. Likewise, the exposure portion Ep on a negative electrode 20 side is electrically connected to the negative electrode terminal 72. Next, the electrode group 80 is inserted into the case 52, and the case 52 and the lid 54 are joined to each other by laser welding.

In the liquid injection step S500, the electrolytic solution (not shown) is injected into the square housing 50, and the electrode group 80 is impregnated with an electrolytic solution. For example, the electrolytic solution is injected through the liquid injection hole (not shown) provided on the square housing 50. After the injection, the liquid injection hole is sealed by predetermined sealing means (for example, a screw).

The electrolytic solution is prepared by dissolving a Li salt (supporting electrolyte) in an aprotic solvent. Examples of the aprotic solvent which can be used include cyclic carbonates such as ethylene carbonate (EC), propylene carbonate (PC), butylene carbonate (BC), and γ-butyrolactone (γBL); and chain carbonates such as dimethyl carbonate (DMC), ethyl methyl carbonate (EMC), and diethyl carbonate (DEC). Among these aprotic solvents, a combination of two or more kinds is preferable from the viewpoints of electrical conductivity and electrochemical stability. In particular, a mixture of a cyclic carbonate and a chain carbonate is preferably used. At this time, a volume ratio of the cyclic carbonate to the chain carbonate is preferably 1:9 to 5:5.

As the Li salt, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide ($Li(CF_3SO_2)_2N$), or lithium trifluoromethanesulfonate ($LiCF_3SO_3$) can be used.

Among these Li salts, a combination of two or more kinds may be used. The concentration of the Li salt in the electrolytic solution is not particularly limited and is preferably 0.5 mol/L to 2.0 mol/L from the viewpoint of cycle durability. In the embodiment, a gel electrolyte can also be used instead of the electrolytic solution.

As described above, the battery 100 shown in FIG. 10 is manufactured. The battery 100 includes the negative electrode 20 which is manufactured according to the first embodiment and thus is superior in cycle durability. In particular, in an application (for use in a vehicle) in which high-rate charging and discharging is required, the battery 100 can exhibit superior cycle durability.

Hereinabove, the embodiment has been described using a square battery as an example. However, the embodiment is not limited to a square battery and may also be applied to, for example, a cylindrical battery or a laminate battery. The electrode group is not limited to a wound electrode group and may be a laminated (also referred to as "stacked") electrode group.

Hereinafter, the embodiments will be described in more detail using Examples. However, the embodiments are not limited to the following Examples.

Samples A1 to A11 and Samples B1 to B15 which were negative electrodes for a nonaqueous electrolyte secondary battery were prepared as follows. Here, Samples A1 to A11 correspond to Examples, and Samples B1 to B15 correspond to Comparative Examples.

Using Sample A1, the preparation step S101 to the second arrangement step S106 were performed as follows. First, in the preparation step S101, the copper foil 21 (thickness: 10 μm) having the first main surface 21*a* and the second main surface 21*b* was prepared, the first main surface 21*a* and the second main surface 21*b* being opposite sides of the copper foil 21.

Next, in the granulation step S102, the following materials were prepared.

Negative electrode active material: graphite powder
Thickener: CMC
Binder: SBR
Solvent: water The negative electrode active material, the thickener, and the binder were mixed with each other at a mass ratio (negative electrode active material:thickener:binder) of 98:1:1, and the components and water were put into HIGH-SPEED MIXER (manufactured by EARTHTECHNICA Co., Ltd.). Using the same machine, the components were mixed for a predetermined amount of time by setting the rotating speed of an agitator blade to 300 rpm and setting the rotating speed of a chopper blade to 1200 rpm. As a result, a clay-like mixture having a solid content proportion of 71 mass % was obtained. This clay-like mixture was put into an in-line cylindrical granulator (manufactured by EARTH-TECHNICA Co., Ltd.) with a circular die hole having a diameter of 1 mm and underwent extrusion granulation at a rotating speed of 2000 rpm. As a result, a granulated body formed of plural granulated particles 4*a* (diameter d: 1 mm, height h: 1.5 mm) was obtained.

In the pressing step S103 to the copper foil softening step S105, the transfer forming device 90 shown in FIG. 2 was prepared. As the C roller 93, a heat roller whose temperature can be adjusted was used. The temperature of the C roller 93 was set to 200° C., and the rotating speed of the C roller 93 was adjusted such that the contact time between the C roller 93 and the copper foil 21 (second main surface 21*b*) was 10 seconds.

As shown in FIG. 2, the granulated body 4 was pressed between the A roller 91 and the B roller 92 to obtain the first negative electrode mixture layer 22a. Next, in the gap between the B roller 92 and the C roller 93, the first negative electrode mixture layer 22a was pressure-bonded to the first main surface 21a. Concurrently, the copper foil 21 was softened by bringing the C roller 93 and the second main surface 21b into contact with each other. Next, the first negative electrode mixture layer 22a was dried by causing the copper foil 21 to pass through a drying furnace.

20 according to Sample A1 was obtained. The specification common to the respective samples such as the dimension of the negative electrode will be described below in "Preparation of Nonaqueous Electrolyte Secondary Battery"

Samples A2 to A11 were obtained using the same method as in Sample A1, except that the temperature of the C roller (heat roller) and the contact time between the C roller and the copper foil were changed as shown in Table 1. In the following description, Samples A1 to A11 will also be referred to as "Sample Group G1."

| | | Negative Electrode Preparation Step | | | | Evaluation | | | |
|---|---|---|---|---|---|---|---|---|---|
| | | Method of | Copper Foil Softening Step | | | Copper Foil Percentage | Negative Electrode Mixture Layer | | Battery Capacity |
| | Sample | Forming Mixture Layer — | Method of Heat Treatment — | Temperature °C. | Time sec | Elongation After Fracture % | MI — | Amount of CMC Remaining wt % | Retention after 2000 cyc % |
| G1 | A1 | Granulated Body | Heat Roller | 200 | 10 | 3.2 | 0.8 | 0.83 | 82 |
| | A2 | Granulated Body | Heat Roller | 250 | 1 | 10.5 | 1 | 0.89 | 91 |
| | A3 | Granulated Body | Heat Roller | | 5 | 11.6 | 0.8 | 0.87 | 92 |
| | A4 | Granulated Body | Heat Roller | | 10 | 12.3 | 0.7 | 0.86 | 94 |
| | A5 | Granulated Body | Heat Roller | 300 | 1 | 11.8 | 0.9 | 0.84 | 95 |
| | A6 | Granulated Body | Heat Roller | | 5 | 12.6 | 0.8 | 0.83 | 97 |
| | A7 | Granulated Body | Heat Roller | | 10 | 13.4 | 1 | 0.81 | 98 |
| | A8 | Granulated Body | Heat Roller | 350 | 1 | 12.9 | 0.9 | 0.87 | 96 |
| | A9 | Granulated Body | Heat Roller | | 5 | 13.8 | 1.2 | 0.86 | 94 |
| | A10 | Granulated Body | Heat Roller | | 10 | 14.2 | 1.1 | 0.82 | 92 |
| | A11 | Granulated Body | Heat Roller | 400 | 1 | 14.1 | 1 | 0.59 | 77 |
| G2 | B1 | Paste | Heat Roller | 200 | 10 | 2.2 | 1.9 | 0.82 | 79 |
| | B2 | Paste | Heat Roller | 250 | 1 | 10.7 | 1.7 | 0.87 | 86 |
| | B3 | Paste | Heat Roller | | 5 | 11.4 | 1.8 | 0.86 | 85 |
| | B4 | Paste | Heat Roller | | 10 | 12.5 | 2.1 | 0.82 | 83 |
| | B5 | Paste | Heat Roller | 300 | 1 | 11.7 | 1.8 | 0.86 | 89 |
| | B6 | Paste | Heat Roller | | 5 | 12.8 | 2 | 0.84 | 87 |
| | B7 | Paste | Heat Roller | | 10 | 13.6 | 2.2 | 0.82 | 84 |
| | B8 | Paste | Heat Roller | 350 | 1 | 12.8 | 2.1 | 0.84 | 88 |
| | B9 | Paste | Heat Roller | | 5 | 13.7 | 2.2 | 0.83 | 85 |
| | B10 | Paste | Heat Roller | | 10 | 14.3 | 2.4 | 0.81 | 83 |
| | B11 | Paste | Heat Roller | 400 | 1 | 14.3 | 2.5 | 0.57 | 73 |
| G3 | B12 | Granulated Body | Electric Furnace | 250 | 1800 | 14.5 | 1.3 | 0.52 | 66 |
| | B13 | Paste | Electric Furnace | 250 | 1800 | 14.8 | 2.6 | 0.51 | 61 |
| G4 | B14 | Granulated Body | None | 0 | 0 | 1.4 | 0.8 | 0.92 | 76 |
| | B15 | Paste | None | 0 | 0 | 1.3 | 1.7 | 0.92 | 72 |

In the second arrangement step S106, using a transfer forming device in which the C roller 93 was not heated, the second negative electrode mixture layer 22b was obtained with the same method as the first negative electrode mixture layer 22a, and the second negative electrode mixture layer 22b was pressure-bonded to the second main surface 21b. After drying the second negative electrode mixture layer 22b, the first negative electrode mixture layer 22a and the second negative electrode mixture layer 22b were pressed into a predetermined thickness and then were cut into a predetermined dimension. As a result, the negative electrode In each of Samples B1 to B11, the amount of water (solvent) increased during the mixing of the negative electrode active material and the like such that the solid content proportion in the mixture decreased to 50 mass %. As a result, a paste (coating material) was prepared. While applying the paste to one main surface of the copper foil using a die coater, the other main surface of the copper foil was brought into contact with the heat roller under conditions shown in Table 1. Next, using a die coater, the paste was applied to the main surface which had contacted the heat roller. Samples B1 to B11 were obtained using the same method as in Sample A1, except for the above-described configurations. In the following description, Samples B1 to B11 will also be referred to as "Sample Group G2."

A negative electrode was obtained using the same method as in Sample A1, except the heat roller was not used. Next, using an electric furnace, a heat treatment was performed on the negative electrode under conditions shown in Table 1. As a result, Sample B12 was obtained.

A negative electrode was obtained using the same method as in Sample B1, except the heat roller was not used. Next, using an electric furnace, a heat treatment was performed on the negative electrode under conditions shown in Table 1. As a result, Sample B13 was obtained. In the following description, Samples B12 and B13 will also be referred to as "Sample Group G3."

Sample B14 was obtained using the same method as in Sample A1, except that the heat roller was not used. Sample B15 was obtained using the same method as in Sample B1, except that the heat roller was not used. In the following description, Samples B14 and B15 will also be referred to as "Sample Group G4."

Using each of the respective samples, a battery for evaluation having a rated capacity of 4.0 Ah was prepared. In the battery for evaluation, the specification of the respective members will be described below.

FIG. 8 shows the positive electrode. The configuration of the positive electrode was as follows:
Positive electrode active material: $LiNi_{1/3}Co_{1/3}Mn_{1/3}O_2$
Conductive material: AB
Binder: PVDF
Composition: (positive electrode active material:conductive material:binder=90:8:2 (mass ratio))
Positive electrode current collector foil: Al foil having a thickness of 15 μm
Dimension L10: 3000 mm
Dimension W11: 20 mm
Dimension W12: 94 mm
Thickness: 70 μm FIG. 4 shows the negative electrode. The configuration of the negative electrode was as follows:
Negative electrode active material: graphite
Thickener: CMC
Binder: SBR
Composition: (negative electrode active material:conductive material:binder=98:1:1 (mass ratio))
Negative electrode current collector foil: Cu foil having a thickness of 10 μm
Dimension L20: 3300 mm
Dimension W21: 17 mm
Dimension W22: 100 mm
Thickness: 80 μm The configuration of the separator was as follows:
Substrate: laminate in which microporous membranes of PP and PE were laminated in order of PP/PE/PP
Thickness of substrate: 20 μm
Composition of heat resistance layer: (alumina particles:acrylic resin=96:4 (mass ratio))
Thickness of heat resistance layer: 5 μm
Arrangement position of heat resistance layer: negative electrode side FIG. 11 shows the electrode group. The configuration of the electrode group was as follows:
Dimension W80: 130 mm
Height H80: 50 mm The configuration of the electrolytic solution was as follows:
Li salt: $LiPF_6$ (1.0 mol/L)
Solvent: (EC:DMC:EMC=3:4:3 (volume ratio))
Liquid amount: 45 g Each of the samples and each of the batteries were evaluated as follows.

In an environment of 25° C., the battery was charged to 4.1 V at a constant current of 4 A and then was discharged to 3.0 V at a constant current of 4 A. At this time, the initial capacity (discharge capacity) was measured.

2000 charging-discharging cycles in which charging and discharging which was set as one cycle were performed under the following conditions:
Charging conditions: current value of 20 A, cut-off voltage of 4.1 V
Discharging conditions: current value of 20 A, cut-off voltage of 3.0 V After 2000 cycles, the capacity after cycles was measured using the same method as in the measurement of the initial capacity. The capacity retention after cycles was calculated by dividing the capacity after cycles by the initial capacity. The results are shown in Table 1.

The calculation of the percentage elongation after fracture of the copper foil will be described below. After 2000 cycles, the battery having a voltage of 3.0 V was disassembled to extract the negative electrode. Next, using an adhesive tape, the negative electrode mixture layer was peeled off from the negative electrode to extract the copper foil. The copper foil was cut into a rectangular test piece having a length of 60 mm and a width of 15 mm. This test piece was set in a fixture (chuck) of a tensile testing machine so as not to be loosened or deformed. The distance between two gauge points was set as 20 mm, the tension speed was set as 100 mm/min, and the test piece was stretched in a longitudinal direction thereof. At this time, the percentage elongation after fracture was calculated from the following expression:

$$\text{(Percentage Elongation after Fracture)} = \{(X1-X0) \div X0\} \times 100 \qquad (i),$$

wherein X0 represents the distance between two gauge points when a load started to be applied to the test piece, and X1 represents the distance between two gauge points when the test piece was fractured such that the applied load was released. The results are shown in Table 1.

The calculation of the migration index (MI) of the negative electrode mixture layer will be described below. After 2000 cycles, the battery having a voltage of 3.0 V was disassembled to extract the negative electrode. MI was calculated by modifying SBR with Br and then analyzing a section of the negative electrode through SEM-EDX according to the above-described method. The results are shown in Table 1.

The amount of CMC remaining in the negative electrode mixture layer will be described below. After 2000 cycles, the battery having a voltage of 3.0 V was disassembled to extract the negative electrode. The negative electrode mixture layer was scraped off from the negative electrode to extract the negative electrode mixture. By using this negative electrode mixture as a test sample, thermogravimetry (TG) was performed. In this experiment, as described above, each of the negative electrodes contained CMC as the thickener. It is known that CMC is carbonized (burned) at about 190° C. The measurement temperature range ranged from room temperature to 250° C., and the mass loss rate of CMC with respect to the mass of the negative electrode mixture, that is, the amount of CMC remaining was calculated. The results are shown in Table 1. In this experiment, when the carbonization of CMC progresses, the amount of CMC remaining is small.

Figure 12:
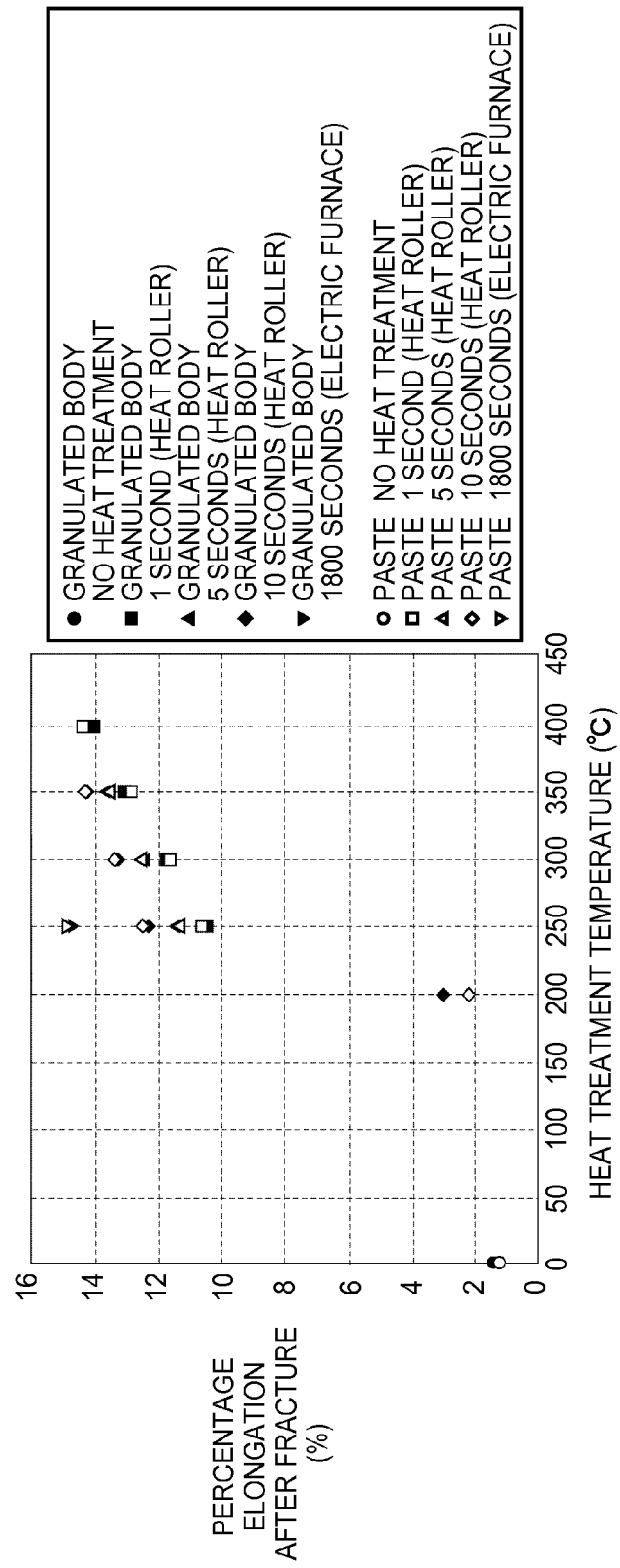
FIG. 12 is a graph showing an example of a relationship between the percentage elongation after fracture of a copper foil, and the heat treatment temperature and time in a copper foil softening step.

Hereinafter, the experiment results and the discussion thereof will be described. First, the softening of the copper foil will be described. FIG. 12 is a graph in which a relationship between the temperature and time in the copper foil softening step and the percentage elongation after fracture of the copper foil is plotted based on data shown in Table 1. It was found from FIG. 12 that the softening of the copper foil started at about 200° C. Accordingly, it is considered that the recrystallization temperature of the copper foil is lower than 200° C. As shown in FIG. 12, the percentage elongation after fracture of the copper foil rapidly increased from about 200° C. and increased in the form of a linear function after 250° C. In consideration of the treatment efficiency based on the above results, it can be said that the temperature of the roller is preferably 200° C. or higher and more preferably 250° C. or higher.

As the heat treatment time increases, the percentage elongation after fracture of the copper foil increases. However, in consideration of thermal damage on the negative electrode mixture layer and productivity, the shorter the heat treatment time, the better. In FIG. 12, the percentage elongation after fracture of the sample, on which the heat treat was performed using an electric furnace at 250° C. for 1800 seconds, was about from 14.5% to 15%. On the other hand, in the sample which was prepared by using the heat roller and setting the temperature of the roller to 350° C., a percentage elongation after fracture of 14% or higher was able to be realized after about 10 seconds. It can be said from this result that the heat treatment time can be significantly reduced by adopting the method of bringing the copper foil into contact with the heat roller. In this experiment, sufficient percentage elongation after fracture can be secured in a range from 1 second to 10 seconds by adopting the heat roller.

Figure 13:
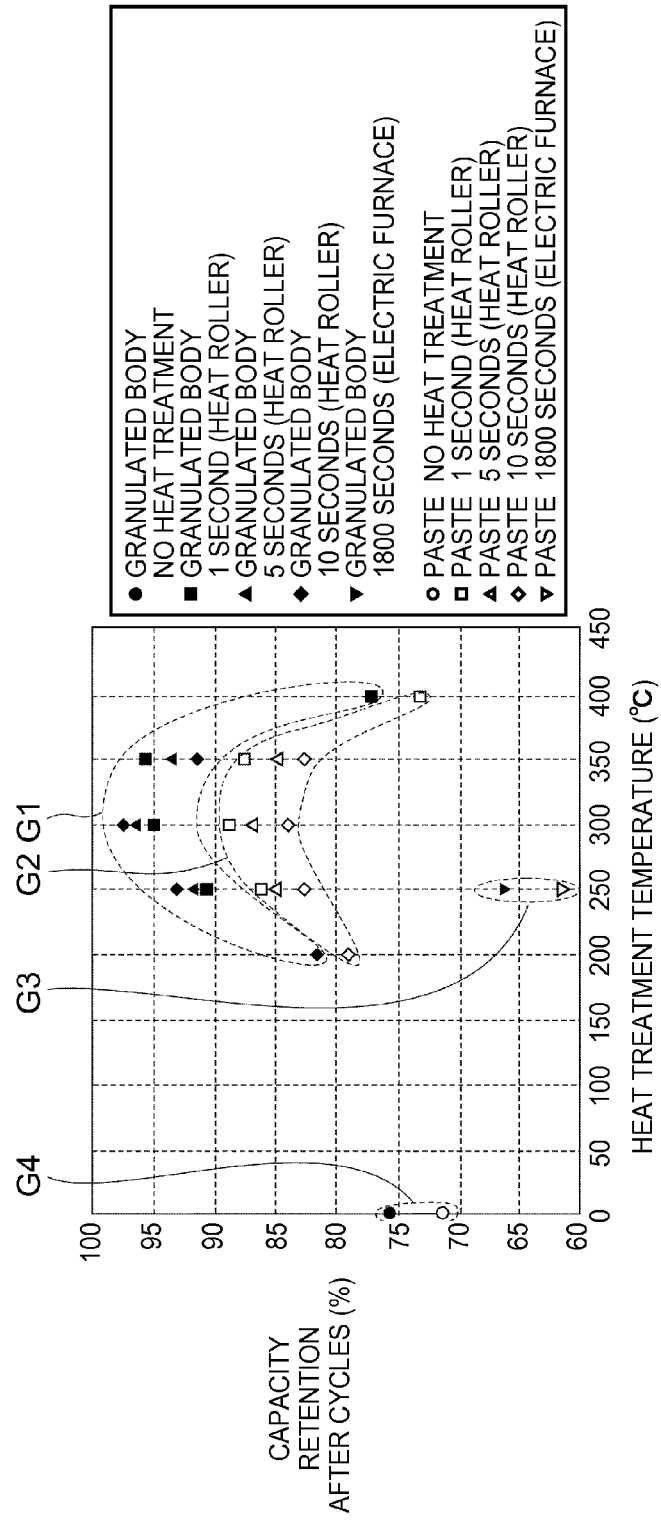
FIG. 13 is a graph showing an example of a relationship between the capacity retention after cycles, and the heat treatment temperature and time in the copper foil softening step.

Next, a relationship between the softening of the copper foil and cycle durability will be described. FIG. 13 is a graph in which a relationship between the temperature and time in the copper foil softening step and the capacity retention after cycles is plotted based on data shown in Table 1. In FIG. 13, in Sample Group G1 (Examples) and Sample Group G2 which underwent the copper foil softening treatment, the capacity retention was higher than that in Sample Group G4 which did not undergo the copper foil softening step. When the temperature of the roller in the copper foil softening step increased from 200° C. to 250° C., the capacity retention significantly increased. This temperature zone substantially matches the above-described temperature zone in which the percentage elongation after fracture rapidly increased. Accordingly, it is strongly implied that cycle durability was improved by the copper foil being softened.

In FIGS. 12 and 13, in a region where the capacity retention significantly increased, the percentage elongation after fracture of the copper foil was from 10% to 15%. Accordingly, it is preferable that the conditions of the copper foil softening step is adjusted such that the percentage elongation after fracture of the copper foil which has undergone the copper foil softening step is from 10% to 15%. The percentage elongation after fracture of the copper foil which has undergone the copper foil softening step is more preferably from 10.5% to 14.2% and still more preferably from 11% to 13.8%.

Next, migration index (MI) will be described. In Sample Group G1 (Examples) including the negative electrode mixture layer which was formed of the granulated body, the capacity retention was significantly improved to be higher than that in Sample Group G2 including the negative electrode mixture layer which was formed of the paste. The reason for this can be understood based on MI. As shown in Table 1, MI in Sample Group G2 was about 2.0, whereas MI in Sample Group G1 was about 1.0. That is, in Sample Group G2, the binder segregated on the surface side in the thickness direction of the negative electrode mixture layer, which caused the peeling between the negative electrode mixture layer and the copper foil and an increase in resistance on the surface. On the other hand, in Sample Group G1, the binder was substantially uniformly distributed in the thickness direction of the negative electrode mixture layer. Therefore, it is considered that the peeling between the negative electrode mixture layer and the copper foil and an increase in resistance on the surface were suppressed.

Next, the carbonization of CMC will be described. In Sample Group G3, the heat treatment was performed for a long period of time, and the percentage elongation after fracture of the copper foil was the maximum. However, the capacity retention was lower than that of Sample Group G4 on which the heat treatment was not performed. The reason for this can be understood based on the carbonization of the thickener (CMC). That is, as shown in Table 1, in Sample Group G3, the heat treatment was performed for a long period of time; as a result, CMC was carbonized, and the amount of CMC remaining was low. Therefore, it is considered that resistance increased, and the capacity retention decreased.

It was found from Table 1 that, in Sample A11 which was prepared by setting the temperature of the roller in the copper foil softening step as 400° C. and setting the contact time as 1 second, the carbonization of CMC progressed, and the capacity retention was low as compared to the other Examples belonging to Sample Group G1. Therefore, it can be said that the temperature of the roller in the copper foil softening step is preferably 400° C. or lower and more preferably 350° C. or lower.

Hereinabove, the embodiments and Examples of the present invention have been described. However, the embodiments and Examples disclosed herein are merely exemplary and do not limit the present invention. The embodiments and the Examples may be appropriately changed or combined.

What is claimed is:

1. A method of manufacturing a negative electrode for a nonaqueous electrolyte secondary battery, the method comprising:

preparing a copper foil having a first main surface and a second main surface that are opposite sides of the copper foil;

mixing a negative electrode active material, a thickener, a binder, and a solvent with each other to obtain a mixture and granulating the mixture to obtain a granulated body;

obtaining a first negative electrode mixture layer by pressing the granulated body;

arranging the first negative electrode mixture layer on the first main surface; and softening the copper foil by bringing the second main surface into contact with a heated roller in a state where the first negative electrode mixture layer is arranged on the first main surface, wherein a temperature of the heated roller is a recrystallization temperature of the copper foil or higher.

2. The method of manufacturing a negative electrode for a nonaqueous electrolyte secondary battery according to claim 1, wherein during the softening of the copper foil, the temperature of the heated roller is from 200° C. to 400° C.

3. The method of manufacturing a negative electrode for a nonaqueous electrolyte secondary battery according to claim 1, wherein
during the softening of the copper foil, a contact time between the heated roller and the second main surface is from 1 second to 10 seconds.

4. The method of manufacturing a negative electrode for a nonaqueous electrolyte secondary battery according to claim 1, wherein
the prepared copper foil has a percentage elongation after fracture of 3% or lower before the softening, and
the softened copper foil has a percentage elongation after fracture of from 10% to 15%.

5. The method of manufacturing a negative electrode for a nonaqueous electrolyte secondary battery according to claim 1, wherein
the prepared copper foil has a percentage elongation after fracture of 3% or lower before the softening, and
at least one of the temperature of the heated roller and a contact time between the heated roller and the second main surface is adjusted such that the softened copper foil has a percentage elongation after fracture of from 10% to 15%.

6. The method of manufacturing a negative electrode for a nonaqueous electrolyte secondary battery according to claim 1, wherein
the arranging of the first negative electrode mixture layer on the first main surface and the softening of the copper foil are simultaneously performed.

7. The method of manufacturing a negative electrode for a nonaqueous electrolyte secondary battery according to claim 1, wherein
when the granulated body is obtained, a solid content proportion of the granulated body is from 65 mass % to 80 mass %.

8. The method of manufacturing a negative electrode for a nonaqueous electrolyte secondary battery according to claim 1, further comprising
arranging a second negative electrode mixture layer on the second main surface after the softening of the copper foil.

9. The method of manufacturing a negative electrode for a nonaqueous electrolyte secondary battery according to claim 1, wherein the granulated body comprises granulated particles having a diameter of about from 0.5 mm to 2.0 mm.

10. The method of manufacturing a negative electrode for a nonaqueous electrolyte secondary battery according to claim 9, wherein the granulated body comprises granulated particles having a height of about from 1.0 to 3.0 times the diameter.

* * * * *